United States Patent [19]

McClure

[11] 4,259,160
[45] Mar. 31, 1981

[54] VAPOR COMPRESSION DISTILLER AND METHOD

[75] Inventor: Thomas W. McClure, Brookfield, Wis.

[73] Assignee: Aqua-Chem, Inc., Milwaukee, Wis.

[21] Appl. No.: 930,937

[22] Filed: Aug. 4, 1978

[51] Int. Cl.³ .......................... C02F 1/12; B01D 1/28
[52] U.S. Cl. ........................................ 203/1; 203/3; 203/11; 203/26; 203/90; 203/98; 203/DIG. 14; 159/3; 159/24 A; 159/24 B; 202/173; 202/236
[58] Field of Search ................... 203/3, 1, 26, 24, 11, 203/90, 91, DIG. 17, DIG. 14, 98, 73; 202/236, 205, 173, 181, 160; 159/24 A, 24 B, 3

[56] References Cited

U.S. PATENT DOCUMENTS

| | | | |
|---|---|---|---|
| 1,461,640 | 7/1923 | Wirth-Frey | 203/26 |
| 3,288,685 | 11/1966 | Kemper et al. | 203/26 |
| 3,575,007 | 4/1971 | Gunther | 203/26 |
| 3,796,640 | 3/1974 | Boomer | 203/26 |
| 3,956,072 | 5/1976 | Huse | 203/26 |
| 3,957,588 | 5/1976 | Humiston | 203/26 |
| 4,082,616 | 4/1978 | Antony | 202/173 |

Primary Examiner—Wilbur L. Bascomb, Jr.
Attorney, Agent, or Firm—Fred Wiviott

[57] ABSTRACT

A vapor compression distiller having a shell for enclosing a pair of heat exchange tube bundles each having one end connected to a steam chest and its other end connected to a condensate collecting chamber. A vapor compressor has its inlet connected to the shell and the outlet to one steam chest which is coupled to a second steam chest through a steam ejector for elevating the inlet pressure to the second heat exchange tube bundle. A half partition extends across the lower end of the vessel and between the wells to divide the lower portion of the vessel into two sections which are in communication across the upper end of the vessel. One well is connected to receive fresh feed liquid and the other includes a density sensor to discharge a portion of the concentrate to therein maintain a desired concentrate level and each well is connected to a spray nozzle manifold disposed in its respective shell section.

19 Claims, 3 Drawing Figures

VAPOR COMPRESSION DISTILLER AND METHOD

BACKGROUND OF THE INVENTION

This invention relates to vapor compression distillers.

One process for concentrating liquids for further use or more convenient disposal involves vapor compression distillers wherein the feed solution is subject to evaporation and the residual liquid becomes more concentrated. Such distillers generally include a heat exchange tube bundle over which liquid is sprayed, and through which compressed vapor is passed. A portion of the feed liquid passing over the external surfaces of the heat exchange tube is vaporized and the remaining more concentrated liquid is collected in a well at the lower end of the device while the vapor passing through the tubes is condensed and withdrawn. The vaporized feed liquid is compressed in a vapor compressor and delivered to the interior surfaces of the heat exchange tubes. When the liquid has been concentrated to the desired degree, it may be withdrawn continuously or periodically from the well and fresh feed liquid is added to replenish that which is withdrawn and the portion that is evaporated.

The efficiency of vapor compression distillers is a function of the difference between the temperature at which the liquid boils and the boiling temperature of water at the same pressure which is called the boiling point elevation (BPE) and the viscosity of the liquid. In the treatment of certain liquids, both the boiling point elevation and viscosity rise in relation to the concentration of the liquid. For example, in waste liquids from soft drink bottling plants which contain a sugar concentration of one to two percent, the boiling point elevation is less than one degree and the viscosity is less than one centipoise. However, when such liquids have been concentrated to a thirty percent sugar solution, the boiling point elevation is about 4° F. and the viscosity is three to four centipoise. The liquid being evaporated in conventional vapor compression distillers has substantially the same concentration as the final concentrate. Accordingly, where there is a substantial boiling point elevation and/or viscosity for the concentrate being evaporated, the efficiency of vapor compression distillers is substantially reduced.

When certain solutions are evaporated, such as those containing high concentrations of carbonate ions, large quantities of $CO_2$ are released. This gas which is non-condensable tends to reduce the temperature at which vapor can exist within the heat exchange tubes. Thus, the temperature differential between the vapor and the water on the outer surface of the heat exchange tubes may become too small for effective evaporation.

SUMMARY OF THE INVENTION

An object of the present invention is to provide a new and improved vapor compression method and apparatus.

Another object of the present invention is to provide a vapor compression method and apparatus for concentrating solutions which release a high proportion of non-condensable gases.

These and other objects and advantages of the present invention will become more apparent from the detailed description thereof taken with the accompanying drawings.

According to one of its aspects, the invention comprises a distillation system including a vessel having a liquid collector, heat exchange tube means disposed within said vessel and including first and second groups of heat exchange tubes wherein the tubes of each group include inlet and exit ends. Liquid distributing means are disposed in the vessel and are connected to said liquid collector for circulating liquid from the collector over said heat exchange tubes whereby a portion thereof is evaporated. The liquid collector is constructed and arranged for receiving unevaporated liquid from the liquid distributing means and feed liquid delivery means is provided for delivering feed liquid to the system and discharge means discharges concentrate from said liquid collector. Vapor compression delivery means delivers vapor and non-condensable gases at an elevated temperature to the inlet ends of said first group of heat exchange tubes and steam ejector means is connected to the exit ends of said first group of heat exchange tubes for receiving the uncondensed vapor and non-condensable gases therefrom. The steam ejector means is also connected to a high pressure steam source for elevating the pressure of said vapor and for delivering the vapor of elevated pressure to the inlet ends of the second group of heat exchange tubes.

According to another of its aspects, the invention comprises a method of evaporating liquids which release substantial amounts of non-condensable gases in a vapor compression distiller system comprising: contacting one surface of each of first and second groups of heat exchange tubes with the liquid to be evaporated while contacting the other surface of the first group of heat exchange tubes with a first vapor and a non-condensable gas mixture and the other surface of said second group of heat exchange tubes with a second vapor and gas mixture whereby a portion of the feed liquid is evaporated and a quantity of non-condensable gas released, a portion of the vapor in each of said first and second gas mixtures condensing; compressing the evaporated feed liquid and non-condensable gas and contacting the same with the other surface of said first heat exchange tubes as said first vapor and non-condensable gas mixture to at least partially condense said vapor; removing the first vapor and gas mixture after contact with the other surface of said first heat exchange tubes and the partial condensation of said vapor and increasing the pressure of the same and delivering the gas and mixture of increased pressure to the other surface of the second group of heat exchange tubes as the second vapor and gas mixture.

DETAILED DESCRIPTION OF THE PREFERRED EMBODIMENT

Figure 1:
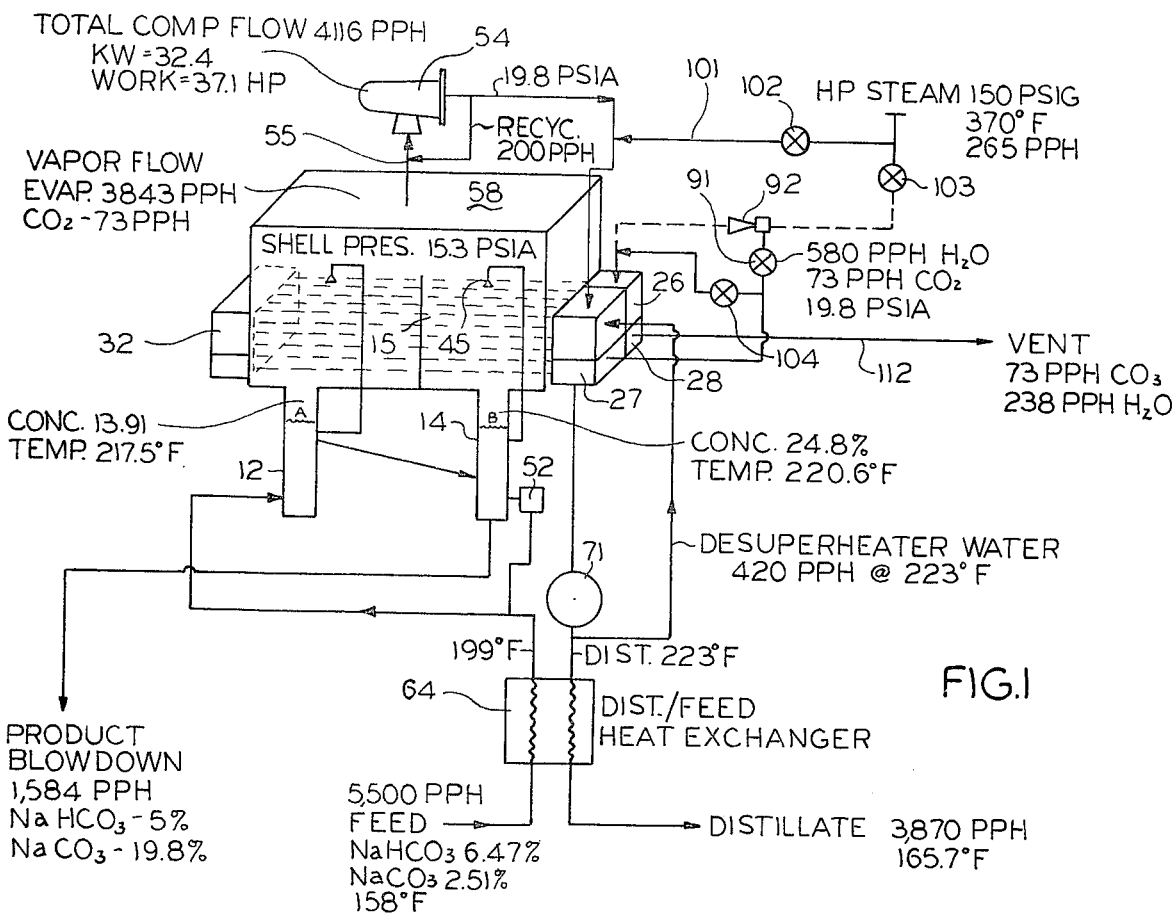
FIG. 1 schematically illustrates a preferred embodiment of the present invention.

FIG. 1 schematically illustrates the apparatus according to the invention to include a hollow metallic shell 10 having any convenient configuration which permits the liquid being treated to flow downwardly and collect in a pair of wells 12 and 14 which extend downwardly from the lower end of shell 10 and in spaced apart relation. A vertical partition wall 15 extends upwardly from the lower end of vessel 10 from a point intermediate the wells 12 and 14 and terminates in spaced relation from the upper end of vessel 10. Extending generally horizontally across vessel 10 and through partition 15 is a multi-pass heat exchanger 16 which may, for example, be of the four pass type, and includes four heat exchange tube bundles 17, 18, 19 and 20. The right ends of the tubes of bundles 17, 18, 19 and 20 are received in a first tube sheet 22 and open into a steam chest 23 affixed to the end of vessel 10. Steam chest 23 is divided by partitions 24 into steam compartments 25 and 26 and condensate collecting compartments 27 and 28 to which the ends of tubes 17, 19, 18 and 20 are connected, respectively. The other ends of the tubes are supported by a second tube sheet 30 at the opposite end of housing 10 and open into a vapor return chamber 31 which is subdivided into compartments 32 and 33 by a vertical partition 34. As a result, the ends of tubes 17 and 18 are connected through compartment 32 and the ends of tubes 19 and 20 are connected through compartment 33. It will be appreciated that instead of employing return chamber 31, tubes 17, 18 and 19, 20 may be joined by a U-bend (not shown).

A liquid circulation system 36 is provided for distributing the liquid being treated over the heat exchange tubes 17, 18, 19 and 20 and includes spray manifolds 38 and 39. The first manifold 39 extends generally horizontally above the heat exchanger 16 and on one side of the partition wall 15. Manifold 38 has a plurality of downwardly directed spray nozzles 40 and is connected by a recirculation pump 42 and conduit 43 to the first well 12. Similarly, the second manifold 35 extends horizontally above the heat exchanger 16 on the opposite side of the partition wall 15 and has a plurality of downwardly directed spray nozzles 45. A second recirculation pump 46 is connected through conduit 48 to manifold 39. In addition, a discharge conduit 49 is connected to conduit 48 and includes a valve 51 operatively connected to a density control 52 which is coupled to receive signals from a density sensor 53 disposed within well 14.

A vapor compressor 54 is provided for compressing vapors generated in vessel 10 and for delivering the same to the steam chest 23. Toward this end, a relatively large vapor conduit 55 connects one end of vessel 10 to the inlet of vapor compressor 54. A second vapor conduit 56 connects the outlet of vapor compressor 54 to the steam chest 23. Any conventional compressor 54 may be employed such as a centrifugal compressor which is driven by any suitable engine or motor 57. Vessel 10 defines a vapor generating space 58 which is connected by a conduit 55 and compressor 54 to the inlet ends of the first heat exchange tube bundle 17. A plurality of baffles 59 and a pair of vapor entrainment separating devices 60 are disposed between the vapor generating space 58 and the inlet of conduit 55.

Fresh feed liquid is provided to well 12 by conduit 62 which is connected at its remote end to a source of such liquid through a heat exchanger 64 and a control valve 65. A float controller 67 is disposed in well 12 and is coupled to valve 62 for regulating the delivery of feed liquid to well 12 in accordance with the level of liquid therein. In addition, a coupling pipe 68 connects the lower ends of wells 12 and 14. Accordingly, the level of liquid in the wells 12 and 14 will remain substantially equal.

The lower end of the condensate collecting compartment 23 is connected by conduit 70 to a condensate tank 71 which in turn is connected by a second conduit 72 to the inlet of a condensate pump 74. The outlet of pump 74 is coupled by a first pipe 76 to discharge or storage through heat exchanger 64 and valve 77; by a second pipe 79 and valves 80 to spray nozzles 82 for cleaning vapor separator 60; and by a third pipe 83 and a valve 84 to a desuperheating spray 86 in the compressed vapor pipe 56.

It will be recalled that the heat exchange tubes 17 and 18 are connected through compartment 32 and tubes 19 and 20 through compartment 33. In addition, condensate collecting chamber 27 connected by pipes 88 and 90 and valve 91 to a steam ejector 92, the outlet of which is coupled by pipe 94 to steam compartment 26 and the inlet ends of tubes 19. It will be recalled that the outlet ends of tubes 19 are connected through compartment 33 to tubes 20 which also open into condensate collecting compartment 28. Condensate which may collect in compartment 28 flows through trap 96 to compartment 27.

The steam ejector 92 is also connected to a high pressure source (not shown) by pipe 98 and valve 100. In addition, a bypass pipe 101 and valve 102 are connected to pipe 98 and compartment 25 to provide start-up steam. A second valve 103 is disposed between pipe 98 and steam ejector 92 and a third valve 104 is disposed in pipe 105 which connects pipes 91 and 94.

Figure 2:
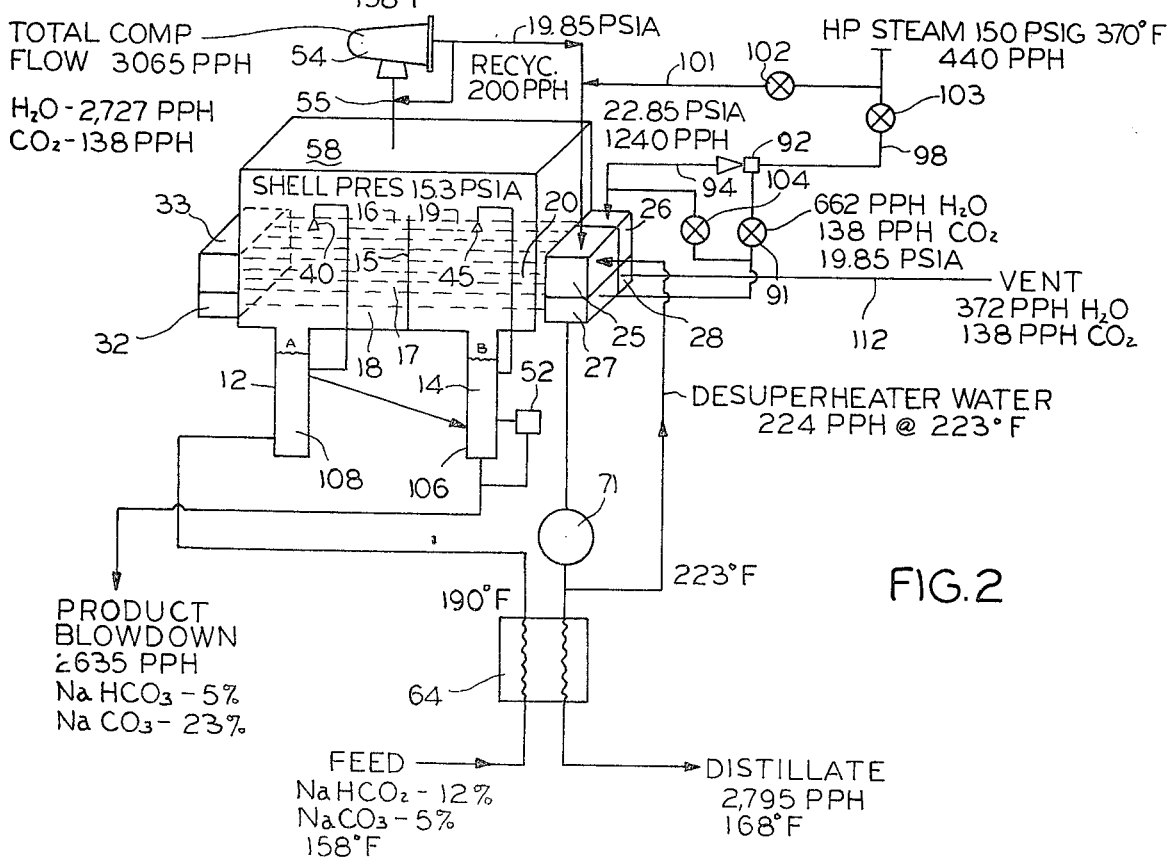
FIG. 2 illustrates the operation of the apparatus and method of the invention under high concentration conditions.

FIG. 2 illustrates the operation of the apparatus of FIG. 1 under high concentration conditions. Here, valves 91 and 103 are open and valves 102 and 104 closed. Assume by way of example that the liquid to be concentrated consists of an aqueous solution having 12% $NaHCO_3$ and 5% $Na_2Co_3$ at a temperature of 158° F. and a flow rate of 5500 pounds per hour (PPH). This solution may, for example, have a temperature of about 158° F. at the inlet of heat exchanger 64 and will undergo a temperature rise in the latter heat exchanger to provide a temperature of about 190° F. at the inlet of well 12. In this example, the density control 52 is set so that concentrate will be withdrawn from well 14 when the concentration of the solution 106 therein is approximately 28% and the temperature about 221.7° F. Under these conditions, the solution 108 in well 12 will be at an intermediate concentration between that of the feed liquid and that in well 14, or approximately 20.2% and the temperature 219.2° F. In addition, the shell pressure will be about 15.3 PSIA.

The recirculation pumps 42 and 46 are operated to draw feed liquid from the wells 12 and 14 and deliver the same to the manifold pipes 38 and 39, respectively (FIG. 1). The feed liquid is then sprayed onto the outer surfaces of the tubes of heat exchanger 16 through which heated vapor is passing. A first portion of the vapor delivered to the heat exchanger 16 is provided by the compressor 54 to the vapor compartment 25 at 19.85 PSIA and 2865 PPH. The vapor delivered to compartment 25 flows through heat exchange tubes 17 to compartment 32 and returns through tubes 18 to compartment 27. As the vapor flows through tubes 17 and 18, a substantial portion condenses as it releases its heat of vaporization to the liquid being sprayed over their outer surfaces. A portion of the liquid in turn vaporizes and flows upwardly to the vapor space 58 above the heat exchanger 16.

The condensation of vapor in tubes 17, 18 reduces the flow of vapor to 662 PPH of water and 138 PPH $CO_2$ at the outlet ends of tubes 18.

As a result of the condensation of vapor in tubes 17, 18, the flow of vapor exiting tubes 18 and flowing into compartment 27 is reduced to 662 PPH of water and 138 PPH carbon dioxide. The pressure remains at 19.85 PSIA. Because of the high percentage of $CO_2$, which is a non-condensable gas, the temperature of the vapor will tend to fall below that which is necessary to vaporize a significant quantity of the liquid being sprayed over tubes 19 and 20. However, in the method and apparatus of the present invention, the pressure of the vapor exiting tubes 18 is increased prior to its delivery to compartment 26 and the inlet ends of tubes 19. In the specifically discussed example, the pressure of this vapor is increased in the steam ejector 92 which is coupled by conduit 98 to a high pressure steam source (not shown) for receiving steam at 150 PSIG and at a rate of 440 PPH. As a result, the vapor pressure at the outlet of steam ejector 92 and in pipe 94 is elevated to 22.85 PSIA and at a flow rate of 1240 PPH. This vapor delivered to compartment 26 flows through tubes 19 to compartment 33 and backwardly through tubes 20 into compartment 28 during which an additional quantity of liquid being sprayed from nozzles 40 and 45 is evaporated.

The water vapor and carbon dioxide released during the evaporation process flows toward the left in vessel 10 as viewed in FIG. 1 and around baffles 59 for passage through the entrainment separators 60 and into the inlet pipe 55 of compressor 54. The vapor pressure at this point is 15.3 PSIA and the flow rate 2727 PPH water and 138 PPH $CO_2$ (FIG. 2). Compressor 54 elevates the vapor pressure to 19.85 PSIA. The delivery rate from compressor 54 is 3065 PPH with 2865 PPH being delivered to compartment 25 and 200 PPH being recycled to inlet conduit 55 of compressor 54.

The unevaporated portion of the liquid 106 and 108 being sprayed from nozzles 40 and 45 returns to its respective brine wells 12 and 14. It will be appreciated that the partition 15 prevents any unevaporated liquid from the spray nozzles 40 or 45 from flowing into the other well 12 or 14. In addition, substantially all of the vapor passing serially through the heat exchange tubes 15, 16, 17 and 18 is condensed as it gives up its heat of vaporization for evaporating the liquid flowing as a thin film over the outer surfaces of the tubes. The condensed vapor is collected in compartments 27 and 28, which are interconnected by trap 96 (FIG. 1). From compartment 27, the vapor flows into the distillate tank 71 from which it may be withdrawn by pump 74. A first portion of the withdrawn condensate may be delivered to desuperheater 86 in pipe 56, a second portion may be delivered to nozzles 82 for cleaning demister pad 60 and a third portion may be discharged through feed liquid preheater 64. In the foregoing example, distillate is delivered to the desuperheater at the rate of 224 PPH and 223° F. and to the heat exchanger 64 at the rate of 2795 PPH and discharges therefrom at a temperature of 168° F. Lastly, uncondensed vapor is withdrawn from compartment 28 through pipe 112 for delivery to a vent condenser 114 which also receives cooling water through pipe 116. The flow rate of vapor to vent condensor 114 equals 372 PPH water and 138 PPH $CO_2$.

As indicated previously, concentrated liquid 106 from sump 14 is periodically removed through pipe 48 when density sensor 53 indicates that concentration thereof is about 28%. A portion of the liquid from the wells 12 and 14 is also evaporated as indicated previously. The float control 67 maintains the level of liquid in wells 12 and 14 so as to compensate for the concentrate discharged and the liquid evaporated by periodically opening valve 65 to admit more feed liquid to well 12. The liquid 108 in well 12 is a mixture of the fresh feed liquid delivered from pipe 62 and the unevaporated feed liquid which falls to the lower end of vessel 10 and on one side of the partition 15. The concentrate liquid 106 in well 14 is a mixture of the liquid 108 which flows to well 14 through pipe 68 and the unevaporated liquid in tank 10 which falls to the other side of partition 15.

Figure 3:
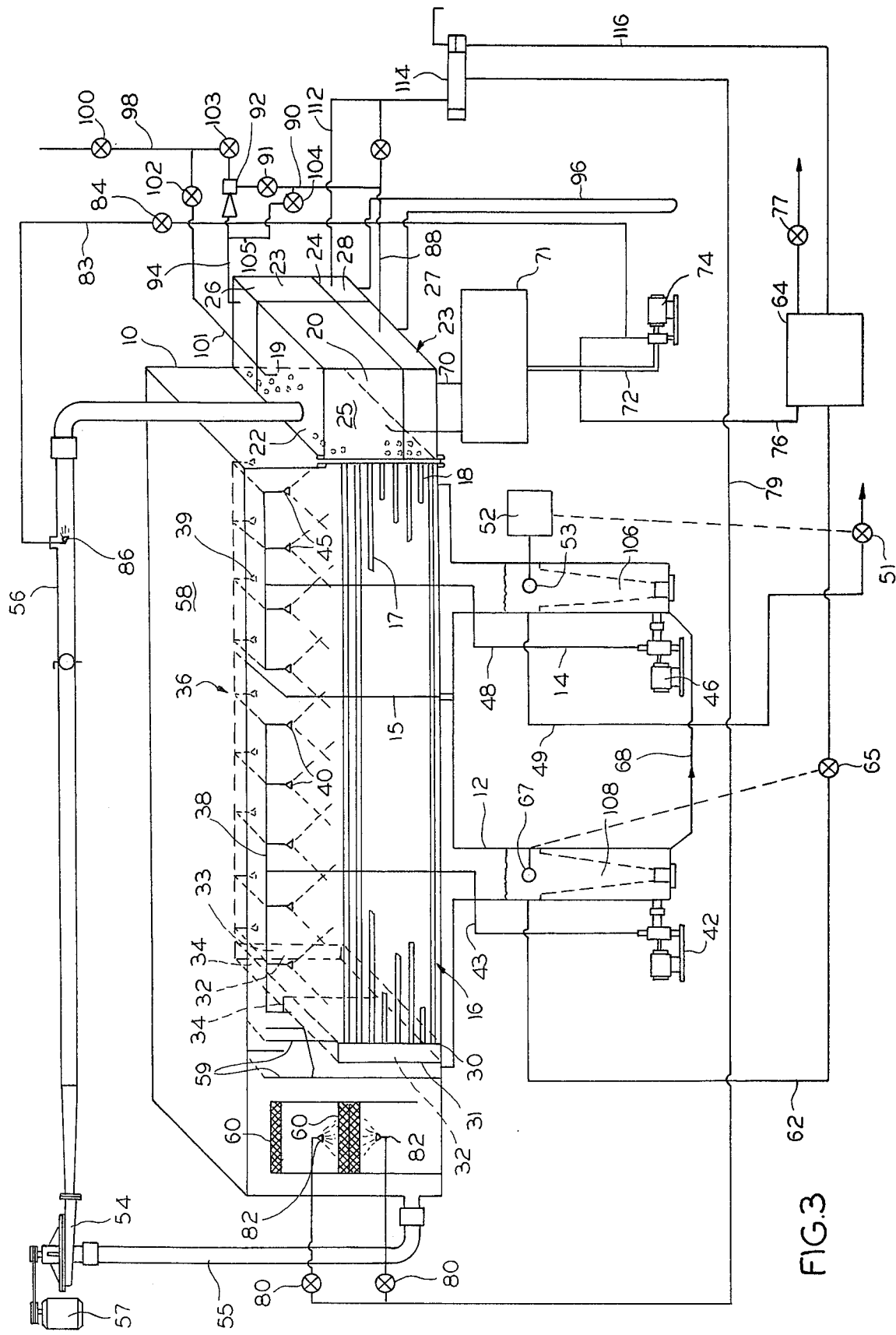
FIG. 3 illustrates the operation of the apparatus and method of the invention under normal concentration conditions.

FIG. 3 illustrates the operation of the apparatus of FIG. 1 under normal concentrating conditions. Here, the feed is delivered to well 12 at 5500 PPH at 158° F. and a concentration of $NaHCO_3$ 6.47% and $Na_2CO_3$ 2.51%. The various concentrations and flow rates are as illustrated. The operation of the apparatus in accordance with FIG. 3 differs from that of FIG. 2 primarily as a result of the lower concentrations, the proportion of non-condensable $CO_2$ released to water vapor is substantially lower. For this reason, the vapor temperature remains within acceptable limits. It is desirable, however, to deliver high pressure steam to the system to insure proper heat balance. Accordingly, the valves 91 and 103 are closed and valves 102 and 104 are open so that the vapor exiting compartment 27 flows directly into compartment 26 and the high pressure steam bypasses steam ejector 92 and is delivered directly into compartment 26.

While only a single embodiment of the invention is illustrated and described, it is not intended to be limited thereby, but only by the scope of the appended claims.

I claim:

1. A vapor compression distiller system including a vessel,
   heat exchange tube means disposed within said vessel and including first and second groups of heat exchange tubes, the tubes of each group including inlet and exit ends,
   said vessel including a liquid collector,
   liquid distributing means disposed in said vessel and connected to said liquid collector for circulating liquid from said liquid collector over said heat exchange tubes whereby a portion thereof is evaporated,
   said liquid collector being constructed and arranged for receiving unevaporated liquid from said liquid distributing means,
   feed liquid delivery means for delivering feed liquid to said system and discharge means for discharging concentrate from said liquid collector,
   vapor compression means connected to said vessel for receiving evaporated liquid and for delivering compressed vapor to the inlet ends of said first group of heat exchange tubes,
   steam ejector means connected to the exit ends of said first group of heat exchange tubes for receiving the uncondensed vapor and non-condensable gases therefrom, said steam ejector means also being connected to a high pressure steam source for elevating the pressure of said vapor, said steam ejector means also being connected to the inlet ends of said second group of heat exchange tubes for delivering vapor at an elevated pressure thereto.

2. The vapor compression distiller set forth in claim 1 wherein each of said first and second groups of heat exchange tubes are divided into a first plurality of tubes and a second plurality of tubes with the inlet ends of said second plurality of tubes being connected to the exit ends of said first plurality of tubes to define first and second tube passes, the exit ends of the second plurality of tubes of the first group being connected to the inlet ends of the first plurality of tubes of the second group through said steam ejector.

3. The system set forth in claim 2 and including a partition disposed in said vessel for dividing the same into first and second compartments, said compartments being in communication at the upper end of said partition, said heat exchange tube means extending through said partition, said liquid collector being divided into first and second liquid collectors disposed in spaced relation and on the opposite sides of said partition, means interconnecting said first and second liquid collectors, said liquid distributing means including first and second liquid distributors disposed in said first and second compartments, respectively, said liquid circulating means including a first liquid circulator for circulating liquid from the first collector to said first liquid distributor and a second liquid circulator for distributing liquid from the second liquid collector to the second liquid distributor, said feed liquid delivery means being connected to said first liquid collector and said discharge means being connected to said liquid collector.

4. A method of evaporating liquids which release substantial amounts of non-condensable gases in a vapor compression distiller system having a vessel, heat exchange tube means disposed within the vessel and including first and second groups of heat exchange tubes, the method comprising:
contacting one surface of each of the first and second groups of heat exchange tubes with the feed liquid to be evaporated while contacting the other surface of the first group of heat exchange tubes with a first vapor and non-condensable gas mixture and the other surface of said second group of heat exchange tubes with a second vapor and gas mixture whereby a portion of the feed liquid is evaporated and a quantity of non-condensable gas released, a portion of the vapor in each of said first and second gas mixtures condensing,
compressing the evaporated feed liquid and non-condensable gas and contacting the same with the other surface of said first group of heat exchange tubes as said first vapor and non-condensable gas mixture to at least partially condense said vapor,
removing said first vapor and gas mixture after contact with the other surface of said first group of heat exchange tubes and the partial condensation of said vapor and increasing the pressure of the same and delivering the vapor and gas mixture of increased pressure to the other surface of said second group of heat exchange tubes as the second vapor and gas mixture.

5. The method set forth in claim 4 wherein each of said first and second groups of heat exchange tubes have inlet and outlet ends, contacting the outer surfaces of all of said heat exchange tubes simultaneously with feed liquid of substantially the same concentration, delivering said first vapor and gas mixture to the inlet ends of said first group of heat exchange tubes, withdrawing non-condensed vapor and noncondensable gases from the outlet end of said first group of heat exchange tubes and increasing the pressure thereof, delivering the vapor and gas of increased pressure to the inlet ends of said second group of heat exchange tubes.

6. The method set forth in claim 5 including the steps of collecting the unevaporated feed liquid, withdrawing at least a first portion thereof as concentrate, recirculating a second portion of the collected feed liquid simultaneously over the outer surfaces of the first and second groups of heat exchange tubes, and adding fresh unconcentrated feed liquid.

7. The method set forth in claim 6 wherein said feed liquid includes a high concentration of carbonate ions.

8. The method set forth in claim 7 including the steps of delivering the feed liquid to a first liquid container for mixing with a partially concentrated feed liquid therein for providing a first liquid mixture,
delivering a first portion of said first liquid mixture to a first outer surface area of each of said first and second groups of heat exchange tubes,
delivering a second portion of said first liquid mixture to a second liquid container containing said feed liquid which is more heavily concentrated than the first liquid mixture to define a second liquid mixture,
delivering a first portion of said second liquid mixture to a second surface area of each of said first and second groups of heat exchange tubes.

9. The method set forth in claim 8 and including measuring the density of liquid in said second liquid container and discharging a second portion of said second liquid mixture when the same reaches a predetermined concentration.

10. The invention set forth in claim 9 and including the step of determining the level of liquid in said first container and delivering feed liquid thereto when said feed liquid level falls below a predetermined value.

11. The method set forth in claim 10 wherein the unevaporated portions of said first and second liquid mixtures are returned to their separate liquid containers without mixing.

12. The method set forth in claim 4 including the steps of collecting the unevaporated feed liquid, withdrawing at least a first portion thereof as concentrate, recirculating a second portion of the collected feed liquid simultaneously over the outer surfaces of the first and second groups of heat exchange tubes, and adding fresh unconcentrated feed liquid.

13. The method set forth in claim 4 wherein said feed liquid includes a high concentration of carbonate ions.

14. The method set forth in claim 4 including:
the steps of delivering the feed liquid to a first liquid container for mixing with a partially concentrated feed liquid therein for providing a first liquid mixture,
delivering a first portion of said first liquid mixture to a first outer surface area of each of said first and second groups of heat exchange tube means,
delivering a second portion of said first liquid mixture to a second liquid container containing said feed liquid which is more heavily concentrated that the first liquid mixture to define a second liquid mixture,
delivering a first portion of said second liquid mixture to a second surface area of each of said first and second groups of heat exchange tube means.

15. The method set forth in claim 14 and including measuring the density of liquid in said second liquid container and discharging a second portion of said second liquid mixture when the same reaches a predetermined concentration.

16. The invention set forth in claim 15 and including the step of determining the level of liquid in said first container and delivering feed liquid thereto when said feed liquid level falls below a predetermined value.

17. The method set forth in claim 16 wherein the unevaporated portions of said first and second liquid mixtures are returned to their separate liquid containers without mixing.

18. A distillation system including a vessel, heat exchange tubes means disposed within said vessel and including first and second groups of heat exchange tubes, the tubes of each group including inlet and exit ends, said vessel including a liquid collector, liquid distributing means disposed in said vessel and connected to said liquid collector for circulating liquid from said liquid collector over said heat exchange tubes whereby a portion thereof is evaporated and at least a portion of the vapor therein condenses, means for collecting the vapor condensate and for removing the same from said vessel, said liquid collector being constructed and arranged for receiving unevaporated liquid from said liquid distributing means, feed liquid delivery means for delivering feed liquid to said system and discharge means for discharging concentrate from said liquid collector, vapor means for withdrawing evaporated feed liquid from the vessel and for elevating the temperature thereof and for delivering said evaporated feed liquid and noncondensable gases at an elevated temperature to the inlet ends of said first group of heat exchange tubes as the vapor input thereto, steam ejector means connected to the exit ends of said first group of heat exchange tubes for receiving the uncondensed vapor and noncondensable gases therefrom, said steam ejector means also being connected to a high pressure steam source for elevating the pressure of said vapor, said steam ejector means also being connected to the inlet ends of said second group of heat exchange tubes for delivering vapor at an elevated pressure thereto.

19. A method of evaporating liquids which release substantial amounts of noncondensable gases in a vapor compression distiller system having a vessel, heat exchange tube means disposed within the vessel and including first and second groups of heat exchange tubes, the method comprising:

contacting one surface of each of the first and second groups of heat exchange tubes with the feed liquid to be evaporated while contacting the other surface of the first group of heat exchange tubes with a first vapor and noncondensable gas mixture and other surface of said second group of heat exchange tubes with a second vapor and gas mixture whereby a portion of the feed liquid is evaporated and a portion of the vapor in each of said first and second gas mixtures condenser, removing said evaporated feed liquid from said vessel, collecting said condensed vapors and removing the same from said vessel, compressing the evaporated feed liquid and delivering the same and said noncondensable gases at an elevated temperature to the other surface of said first heat exchange tubes as said first vapor and noncondensable gas mixture to at least partially condense said vapor, removing said first vapor and gas mixture after contact with the other surface of said first group of heat exchange tubes and the partial condensation of said vapor and increasing the pressure of the same and delivering the vapor and gas mixture of increased pressure to the other surface of said second group of heat exchange tubes as the second vapor and gas mixture.

* * * * *